(12) United States Patent
Kaneda

(10) Patent No.: US 6,714,682 B2
(45) Date of Patent: Mar. 30, 2004

(54) IMAGE PROCESSING DEVICE AND METHOD AND MEMORY MEDIUM

(75) Inventor: Kitahiro Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/238,550

(22) Filed: Jan. 28, 1999

(65) Prior Publication Data

US 2001/0041014 A1 Nov. 15, 2001

Related U.S. Application Data

(63) Continuation of application No. 08/657,566, filed on Jun. 5, 1996, now Pat. No. 5,900,905.

(30) Foreign Application Priority Data

Jan. 30, 1998 (JP) .............................. 10-019208

(51) Int. Cl.⁷ ................................................ G06K 9/36
(52) U.S. Cl. ..................................................... 382/239
(58) Field of Search ................................ 382/176, 270, 382/271, 272, 273, 274; 358/298, 455, 456, 462, 464, 466

(56) References Cited

U.S. PATENT DOCUMENTS

| | | | | |
|---|---|---|---|---|
| 4,554,593 A | * | 11/1985 | Fox et al. | 358/455 |
| 4,577,235 A | * | 3/1986 | Kannapell et al. | 358/462 |
| 4,707,745 A | * | 11/1987 | Sakano | 382/270 |
| 4,962,540 A | * | 10/1990 | Tsujiuchi et al. | 382/165 |
| 4,965,845 A | * | 10/1990 | Chan et al. | 382/166 |
| 4,982,277 A | * | 1/1991 | Katoh et al. | 358/520 |
| 5,032,904 A | * | 7/1991 | Murai et al. | 382/165 |
| 5,109,274 A | * | 4/1992 | Washio et al. | 382/165 |
| 5,109,451 A | * | 4/1992 | Aono et al. | 382/166 |
| 5,134,667 A | * | 7/1992 | Suzuki | 382/164 |
| 5,144,688 A | * | 9/1992 | Bovir et al. | 382/166 |
| 5,204,920 A | * | 4/1993 | Moran et al. | 382/166 |
| 5,267,333 A | * | 11/1993 | Aono et al. | 382/166 |
| 5,995,241 A | * | 11/1999 | Nakatani et al. | 358/426 |
| 6,154,569 A | * | 11/2000 | Sakaue et al. | 382/233 |
| 6,301,395 B1 | * | 10/2001 | Nishigaki et al. | 382/266 |
| 6,330,076 B1 | * | 12/2001 | Imaizuni et al. | 358/1.9 |
| 6,348,969 B1 | * | 2/2002 | Ikeda | 358/1.15 |

FOREIGN PATENT DOCUMENTS

JP    6-68301    6/1994

* cited by examiner

*Primary Examiner*—Jose L. Couso
(74) *Attorney, Agent, or Firm*—Fitzpatrick, Cella, Harper & Scinto

(57) ABSTRACT

An object of the invention is to designate an image compressing system every tile. To achieve this object, an image input device is constructed by an image scanner, a film scanner, an electronic camera, etc. Image data inputted by the image input device are stored to an image memory. A discriminating circuit reads the image data from the image memory and discriminates area information of the read image every tile. A converting circuit converts the image stored to the image memory to a flashpix image on the basis of the area information discriminated by the discriminating circuit.

24 Claims, 10 Drawing Sheets

TILE AREA

|  | ATTRIBUTE |
|---|---|
| 1st LEVEL (ORIGINAL RESOLUTION, 256×256) | A |
| 2nd LEVEL (128×128) | A |
| 3rd LEVEL (64×64) | B |

FIG. 10

| PROPERTY | ID CODE | TYPE |
|---|---|---|
| A — NUMBER OF RESOLUTIONS | 0x01000000 | VT_U14 |
| B { HIGHEST RESOLUTION WIDTH | 0x01000002 | VT_U14 |
| HIGHEST RESOLUTION HEIGHT | 0x01000003 | VT_U14 |
| C { DEFAULT DISPLAY HEIGHT | 0x01000004 | VT_R4 |
| DEFAULT DISPLAY WIDTH | 0x01000005 | VT_R4 |
| DISPLAY HEIGHT/WIDTH UNITS | 0x01000006 | VT_U14 |

| PROPERTY | ID CODE | TYPE |
|---|---|---|
| SUBIMAGE WIDTH | 0x02//0000 | VT_U14 |
| SUBIMAGE HEIGHT | 0x02//0001 | VT_U14 |
| C { SUBIMAGE COLOR | 0x02//0002 | VT_BLPB |
| SUBIMAGE NUMERICAL FORMAT | 0x02//0003 | VT_U14 \| VT_VECTOR |
| D { DECIMATION METHOD | 0x02//0004 | VT_14 |
| DECIMATION PREFILTER WIDTH | 0x02//0005 | VT_R4 |
| E — SUBIMAGE ICC PROFILE | 0x02//0007 | VT_U12 \| VT_VECTOR |

| PROPERTY | ID CODE | TYPE |
|---|---|---|
| F { JPEG TABLES | 0x03//0001 | VT_BLOB |
| MAXIMUM JPEG TABLE INDEX | 0x03000002 | VT_U14 |

FIG. 11

| FIELD | LENGTH | BYTE |
|---|---|---|
| LENGTH OF HEADER STREAM HEADER | 4 | 0—3 |
| IMAGE WIDTH | 4 | 4—7 |
| IMAGE HEIGHT | 4 | 8—11 |
| NUMBER OF TILLES | 4 | 12—15 |
| TILE WIDTH | 4 | 16—19 |
| TILE HEIGHT | 4 | 20—23 |
| NUMBER OF CHANNELS | 4 | 24—27 |
| OFFSET TO TILE HEADER TABLE | 4 | 28—31 |
| LENGTH OF TILE HEADER ENTRY | 4 | 32—35 |
| TILE HEADER TABLE | VARIABLE | VARIABLE |

IMAGE PROCESSING DEVICE AND METHOD AND MEMORY MEDIUM

This application is a continuation of 08/657,566 filed Jun. 5, 1996, now U.S. Pat. No. 5,900,905, issued May 4, 1999.

BACKGROUND OF THE INVENTION

1. Field of the Invention

The present invention relates to image processing device and method and a memory medium, and more concretely relates to image processing device and method and a memory medium for converting an input image to a structuralized image format.

2. Related Background Art

A file format for structuralizing image data is proposed as an image format. A method for dividing an image into small areas and applying suitable compressing method and condition every each of the small areas is also known as a method for compressing the image.

However, a means for automatically applying the suitable compressing method and condition to the image every small area is desired.

SUMMARY OF THE INVENTION

In consideration of the above respects, an object of the present invention is to perform suitable image compressing processing every small area.

Under such an object, another object of the present invention is to provide image processing device and method and a memory medium capable of suitably automatically designating compressing method and condition every small area.

To achieve these objects, an embodiment of the present invention discloses an image processor for converting an input image to a format capable of changing a compressing method every each of areas having equal sizes, and comprising input means for inputting the input image; control means for storing the input image to memory means; discriminating means for discriminating area information of the image stored to the memory means; and converting means for converting the input image to the format on the basis of discriminating results of the discriminating means.

An even further object of the present invention is to perform suitable image processing every area suitable for an image format.

An even further object of the present invention is to provide an image processing method having a novel function.

The other objects and features of the present invention will become apparent from the following embodiments and drawings.

BRIEF DESCRIPTION OF THE DRAWINGS

FIG. 10 is an explanatory table of an image contents property set.

FIG. 11 is an explanatory table of a subimage header.

DESCRIPTION OF THE PREFERRED EMBODIMENTS

The embodiments of the present invention will next be described in detail with reference to the drawings.

Figure 1:
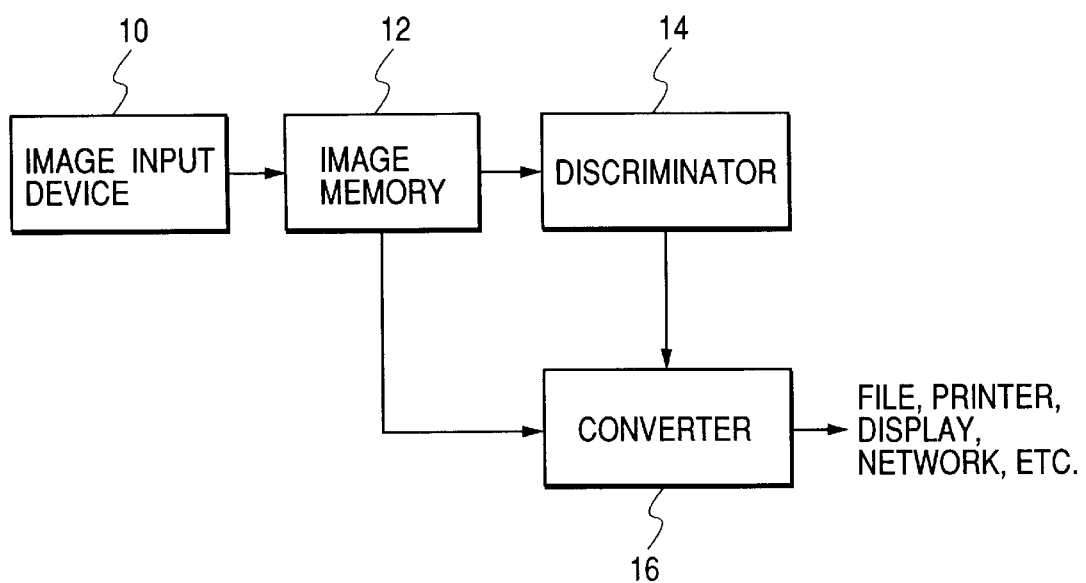
FIG. 1 is a schematic constructional block diagram showing one embodiment of the present invention.

FIG. 1 is a schematic constructional block diagram showing one embodiment of the present invention. Reference numeral 10 designates an image input device constructed by an image scanner, a film scanner, an electronic camera, etc. Reference numeral 12 designates an image memory for storing an image inputted by the image input device 10. Reference numeral 14 designates a discriminating circuit for discriminating area information from the image stored into the image memory 12. Reference numeral 16 designates a converting circuit for converting the image stored to the image memory 12 to a flashpix image in accordance with each area information discriminated by the discriminating circuit 14.

Figure 6:
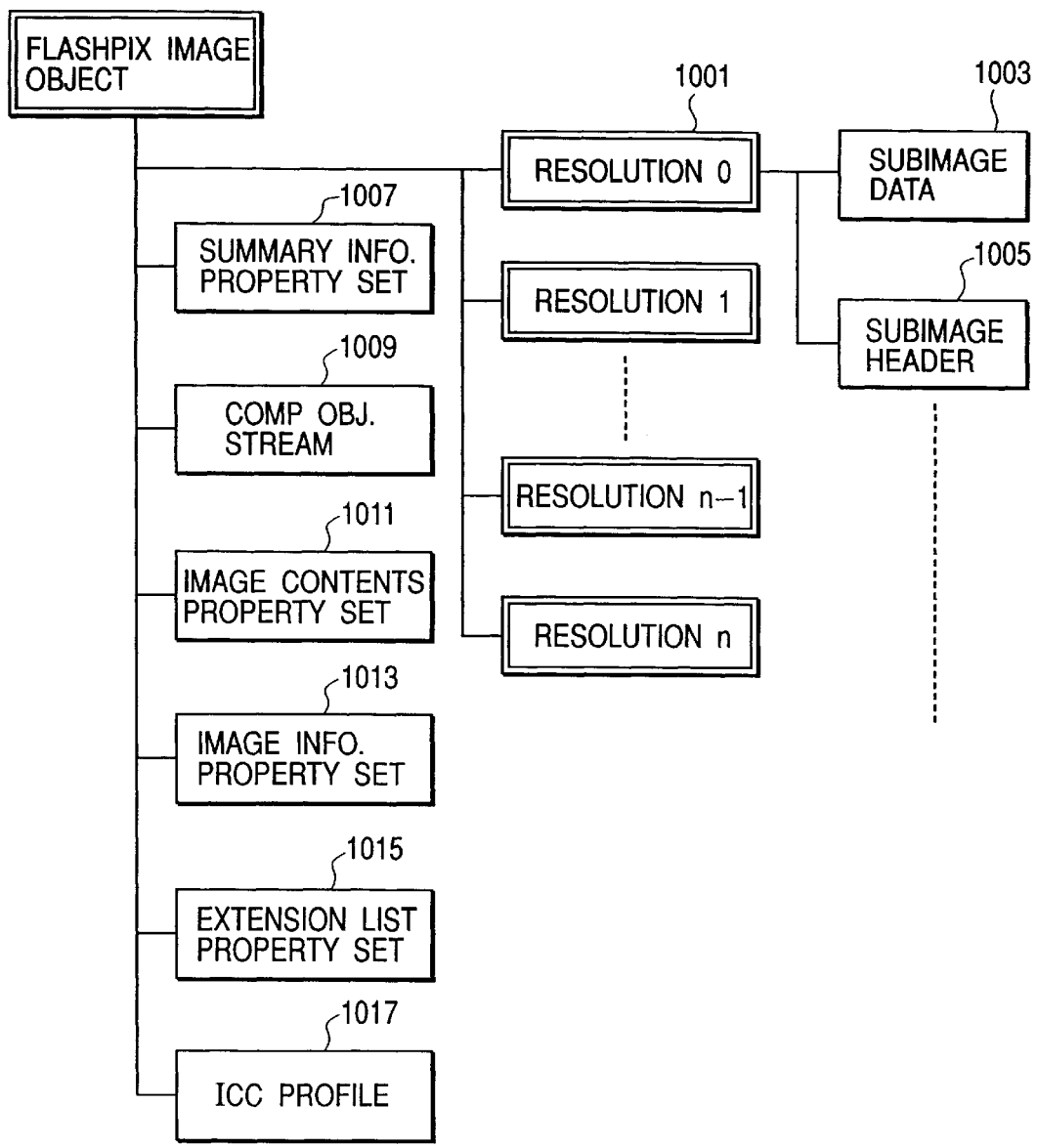
FIG. 6 is an explanatory view of the structure of a structuralized image file.
Figure 7:
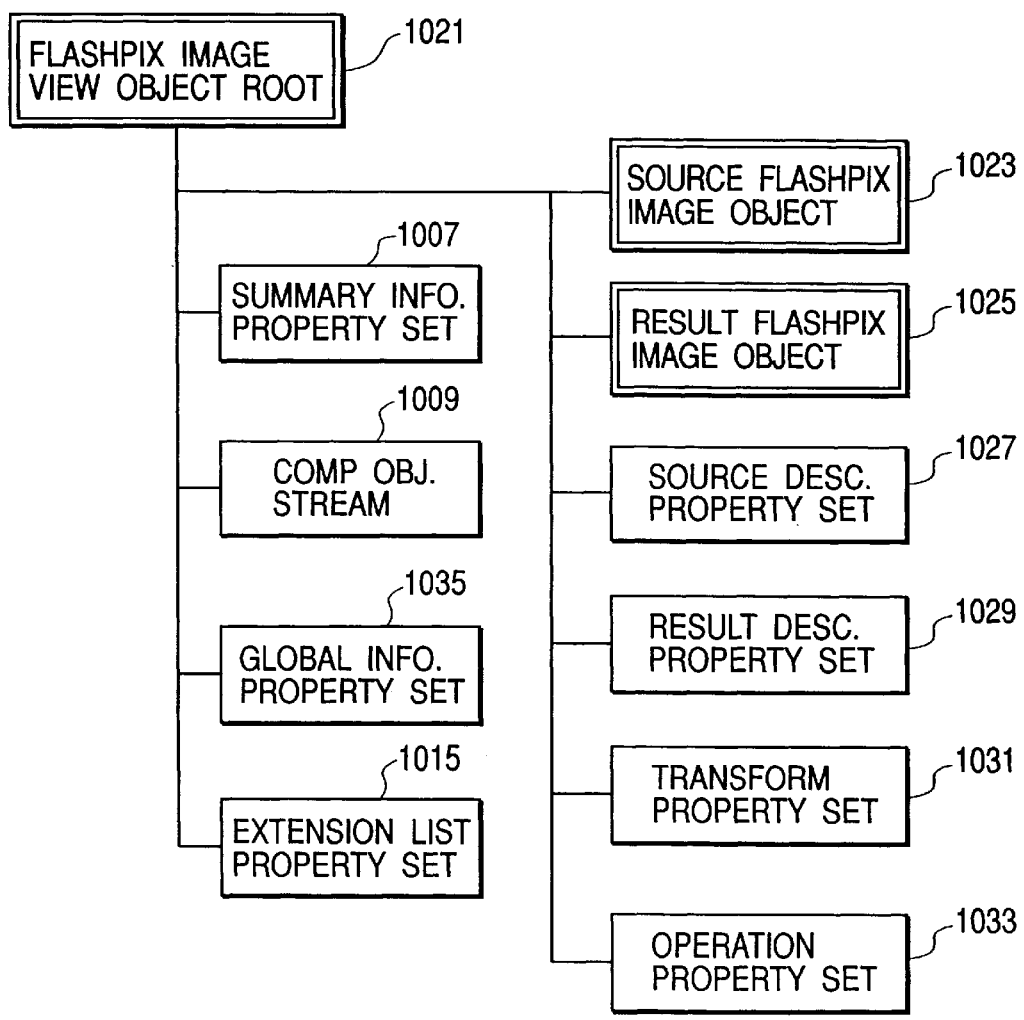
FIG. 7 is an explanatory view of the structure of the structuralized image file.

For example, FlashPix (a trade mark of Eastman Kodak Corporation in U.S.A.) is known as an image format capable of dividing the image into small areas and selecting an image treating method every each of the small areas. In a file format of this FlashPix, image attribute information and image data stored to an image header portion are further structuralized and filed. FIGS. 6 and 7 show a structure of this structuralized image file. Each property and data within the file are accessed by a directory used in a well-known operating system of a personal computer, and a storage and a stream corresponding to the file. In FIGS. 6 and 7, a double frame shows the storage and a single frame shows the stream.

The image data and its image attribute information are stored to a stream portion. The image data are hierarchized in different resolutions. The image in each resolution is called a subimage 1001. In FIG. 6, the respective subimages are shown by resolution 0, resolution 1, - - - , resolution n. With respect to each resolution image, information required to read this image is stored to a subimage header 1005. The image data themselves are stored to subimage data 1003. Such a header 1005 is shown in detail in FIG. 11.

A property set is defined by classifying attribute information in accordance with using objects and contents. The property set is constructed by a summary info. property set 1007, an image info. property set 1013, an image contents property set 1011, an extension list property set 1015, etc. An explanation is omitted with respect to elements directly unrelating to the present invention.

Contents of each property set will next be briefly explained. The summary info. property set 1007 is not peculiar to the flashpix, but is a property set indispensable to a structured storage of Microsoft Corporation in U.S.A. A title, an author, a thumbnail image, etc. of this file are stored.

The image contents property set 1011 has an attribute for describing a storing method of the image data. Each property of this image contents property set 1011 is shown in FIG. 10 as an example. For example, this attribute is described by including a hierarchical number A of the image data, a width and a height B of an image of maximum resolution, a width and a height C of an image of each resolution, a reducing method and a filter D, a color construction E, the definitions F of a quantized table and a Huffman table of JPEG compression, etc.

The image info. property set 1013 stores various information able to be utilized in use of an image, e.g., information about how to input this image and how to be able to utilize this image. For example, this information is constructed by information (file source) relative to an inputting or generating method of digital data, information (intellectual property) relative to a copyright, information (content description) relative to image contents (a person and a place in the image, etc.), information (camera information) relative to a camera used in photographing), information (per picture camera setting) of setting (exposure, shutter speed, focal length, use and unuse of flash, etc.) of the camera at a photographing time, information (digital camera characterization) relative to resolution and a mosaic filter peculiar to a digital camera, information (film description) of a maker name of a film, a product name, a kind (negative, positive, color and black and white), etc., information (original document scan description) relative to a kind and a size of an original when the original is a book and a printed matter, and information (scan device) relative to used scanner and software and an operator in the case of a scan image.

The extension list property set 1015 is used when information not included in a basic specification of the above flashpix is added.

A flashpix image view object 1021 shown in FIG. 7 is a directory or an image file for storing both a viewing parameter and image data used when an image is displayed. The viewing parameter is a set of coefficients of rotation, enlargement, reduction, movement, color conversion and filtering processing of the image applied in the image display.

A source flashpix image object 1023 and a result flashpix image object 1025 are the substance of flashpix image data. The source flashpix image object is indispensable, but the result flashpix image object is an option. The source flashpix image object 1023 stores original image data. The result flashpix image object 1025 stores image data processed by using the viewing parameter.

A source desc. property set 1027 and a result desc. property set 1029 are property sets for discriminating the image data and store an image ID, a property set of change inhibition, a final updating date, etc.

A transform property set 1031 stores affine transformation coefficients for rotation, enlargement, reduction and movement, a color conversion matrix, a contrast adjusting value and a filtering coefficient. Elements respectively having the same functions as the elements previously explained are designated by the same reference numerals and their explanations are omitted here. Further, the explanations of elements directly unrelating to features of the present invention are omitted here.

Figure 8:
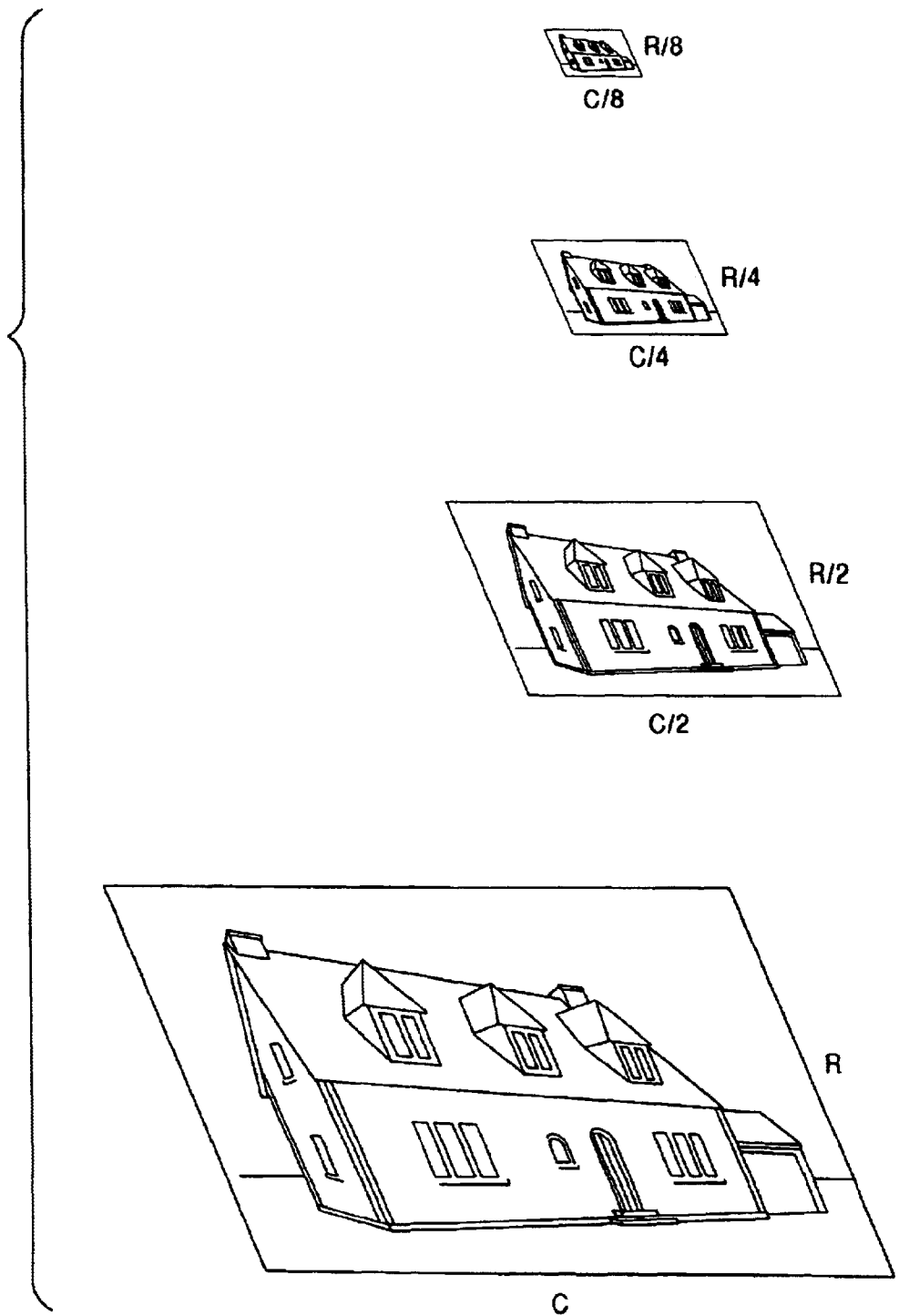
FIG. 8 is a view showing one example of image files having different resolutions.

The treatment of image data will next be explained. FIG. 8 shows one example of plural images having different resolutions. In FIG. 8, an image of maximum resolution is constructed by X0×Y0 in column×row and the next large image is constructed by X0/2×Y0/2. Hereafter, the reduction is sequentially repeated half by half in both column and row until pixels in each of the column and row are equal to or smaller than 64 pixels.

As such a hierarchized result, header information and image data used in a conventional image format are required as attribute information of the image with respect to each hierarchical image in addition to a hierarchical number within one image file. Information relative to the hierarchical number within one image file, a width and a height of the image of maximum resolution, a width and a height of the image of each resolution, a color construction, a compression system, etc. are described within the image contents property set 1011 illustrated in FIG. 10 previously explained.

Figure 9:
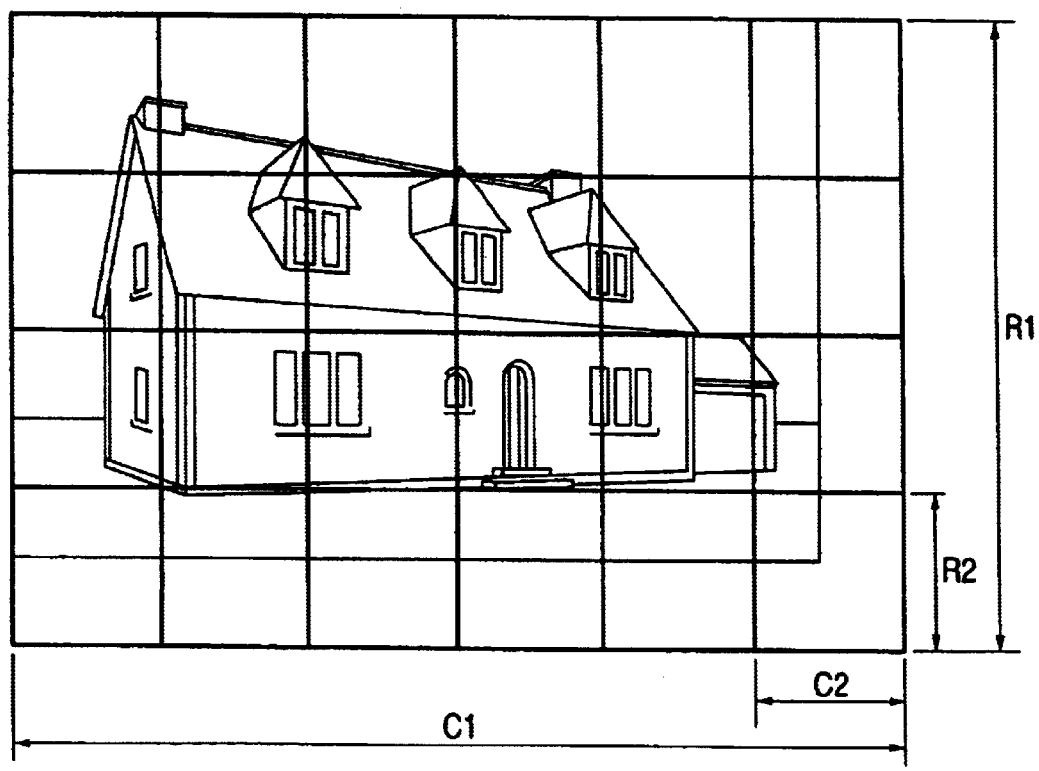
FIG. 9 is an explanatory view of tile division.

As shown in FIG. 9, a layer image of each resolution is divided into 64×64 tiles. When the image is sequentially divided into 64×64 tiles from its left-hand upper portion, there is a case in which blanks are caused in portions of tiles at their right-hand and lower ends in accordance with the image. In this case, 64×64 pixels are constructed by repeatedly inserting a rightmost end image and a lowermost end image into the respective blanks. In the flashpix, the image within each of the tiles is stored by the JPEG compression system, a single color method or a noncompression method. The JPEG compression system is an image compression system internationally standardized by ISO/IECJTC1/SC29. A detailed explanation of this JPEG compression system is omitted here. The single color method is a system for expressing the image in only one color of one tile without recording the individual pixel value when this one tile is entirely constructed by the same color. This method is particularly effective in an image generated by computer graphics.

The image data divided into tiles in this way are stored into the subimage data stream 1003. All of the total number of tiles, sizes of the individual tiles, a data starting position and a compression method are stored to the subimage header 1005 (FIG. 11).

An operation of the image processor in this embodiment will next be explained. Image data inputted by the image input device 10 are stored to the image memory 12. The discriminating circuit 14 reads the image data from the image memory 12 and discriminates area information every small area of the read image. The converting circuit 16 converts the image stored to the image memory 12 to a flashpix image based on the area information discriminated by the discriminating circuit 14.

Figure 2:
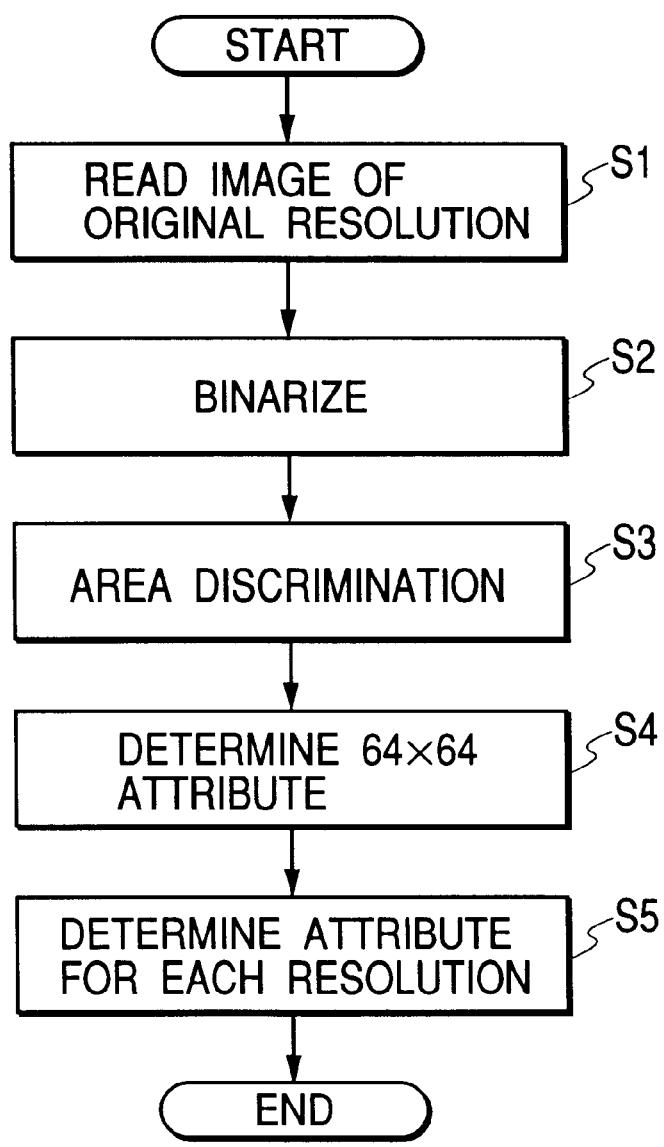
FIG. 2 is a flow chart showing a processing flow of a discriminating circuit 14.

FIG. 2 is a flow chart showing a processing flow of the discriminating circuit 14. An operation of the discriminating circuit 14 will be explained with reference to FIG. 2. An image of original resolution is read from the image memory 12 (S1) and are two-valued (S2). With respect to the two-valued image, for example, a color image, a text, nothing, etc. are discriminated from each other as an attribute of a rectangular area having coordinates in a pixel unit (S3). For example, a block selection technique, etc. described in Japanese Laid-Open (Kokai) patent No. 68301 in 1994 may be applied to this discrimination.

Figure 3:
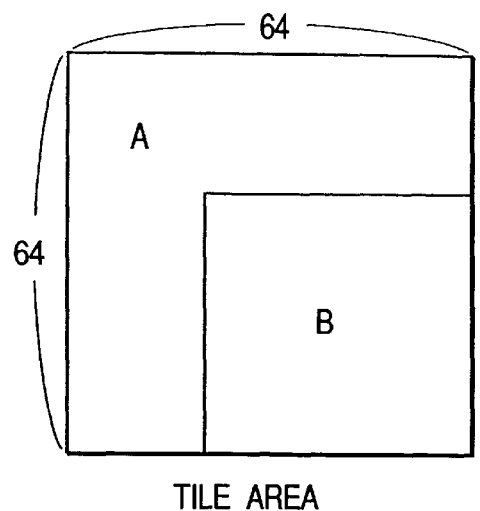
FIG. 3 is an explanatory view of a tile attribute determining method in original resolution.

In the original resolution, an image attribute is determined in a small area (hereinafter, called a tile) in a unit of 64×64 pixels (S4). Concretely, as shown in FIG. 3, when the attributes of A and B are set on a certain tile in step S3, the attribute of a larger area is preferentially determined as an image attribute of this tile.

Figure 4:
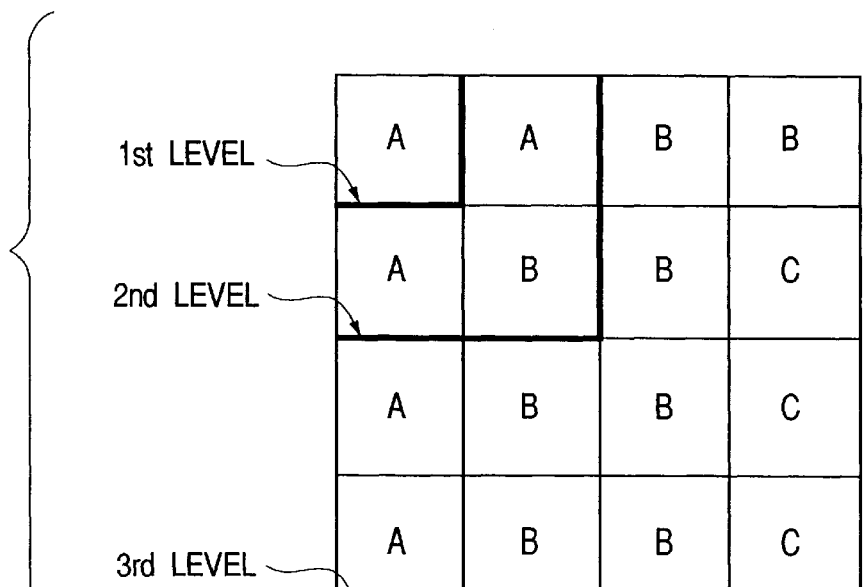
FIG. 4 is an explanatory view of the tile attribute determining method after a second resolution level.

The tile attribute of each resolution is determined in a step S5 from the tile attribute in the original resolution determined in the step S4. Since a flashpix image has an image reduced in resolution half by half longitudinally and transversally with respect to the original resolution, a tile area is relatively increased in size every four times. For example, as shown in FIG. 4, when the original resolution is shown by 256×256 pixels and the tile attribute of 64×64 pixels is determined as shown in FIG. 4 in the step S4, four tile attribute information in the original resolution per one tile is included at the next resolution level (128×128 pixels). Accordingly, in this embodiment, the tile attribute is determined by decision by majority. Since 16 tile attribute information in the original resolution per one tile is included at the next resolution level, the tile attribute is also determined by decision by majority. Since minimum resolution of the flashpix image is shown by 64×64 pixels, the final resolution is set at a third resolution level in this case. The present invention is not limited to decision by majority. For example, in the present invention, the tile attribute of an image may be set such that the attribute of a specific tile, e.g., the attribute of a left-hand upper tile is preferential and resolution is reduced.

Figure 5:
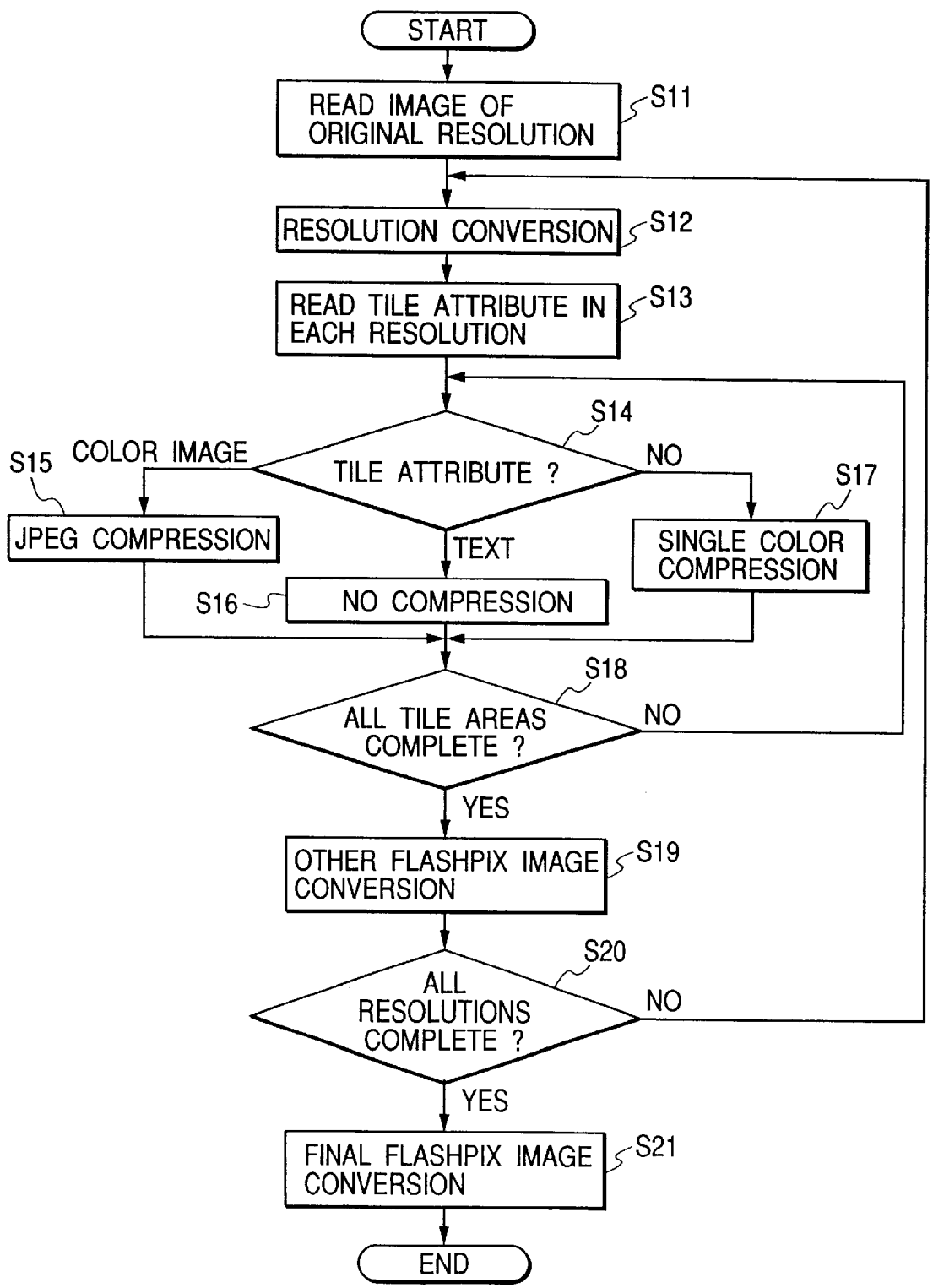
FIG. 5 is a flow chart showing a processing flow of a converting circuit 16.

FIG. 5 is a flow chart showing a processing flow of the converting circuit 16. An operation of the converting circuit 16 will be explained with reference to FIG. 5. An image of the original resolution is read from the image memory 12 (S11), and the original resolution is converted to the next level resolution of the flashpix (S12). A tile attribute of each resolution discriminated by the discriminating circuit 14 is read (S13). The image is compressed by the JPEG system in a step S15 in accordance with the read tile attribute (S14) when the tile attribute shows a color image. In contrast to this, when the tile attribute shows a text area, no image is compressed (S16). Further, in contrast to this, when the tile attribute shows nothing, the image is compressed in a single color (S17). The steps S14 to S17 are executed with respect to all the tiles of a corresponding resolution (S18).

After the steps S14 to S17 are executed with respect to all the tiles of the corresponding resolution (S18), the other flashpix image converting processings are performed with respect to the images of this corresponding resolution (S19).

After the processings in steps S12 to S19 are executed with respect to images of all the resolutions and are terminated (S20), the processed images are finally adjusted to a format of the flashpix image and are outputted (S21).

In this embodiment, the image attribute in a tile unit in each resolution is calculated by applying a block selection technique to the image of the original resolution, and an optimum compressing method can be designated on the basis of this image attribute every individual tile. Accordingly, high efficient image compression utilizing the original format of the flashpix can be realized.

The embodiment is explained with the flashpix as an example, but the present invention is not limited to this example. The present invention can be applied to a format in which the compressing method can be changed by a certain method every area.

In the above embodiment, the color image, the text and nothing are set as attribute information. However, the present invention is not limited to this case. For example, a gray scale image, a line drawing and a text may be set as the attribute information. In this case, a selected compressing means is constructed by the JPEG system, the single color method and the noncompression method.

In the above embodiment, the tile attribute with respect to the resolution image at a second resolution level or later is determined by decision by majority of the tile attribute of the original resolution. However, the present invention is not limited to this case. For example, as mentioned above, the tile attribute with respect to the resolution image at the second resolution level or later may be also determined by decision by majority of the tile attribute of resolution previously set by one.

The present invention may be applied to a system constructed by plural devices (e.g., a host computer, an interface device, a reader, a printer, etc.) and may be also applied to an apparatus constructed by one device (e.g., a copying machine and a facsimile telegraph).

The present invention of this application includes an embodiment in which a program code of software for realizing a function in the above embodiment is applied to a computer within a device or system connected to various kinds of devices to operate these various kinds of devices so as to realize the function in the above embodiment, and the computer (CPU or MPU) of this device or system is operated by operating these various kinds of devices in accordance with a stored program.

In this case, the program code of the above software itself realizes the function in the above embodiment and the program code itself and a means for supplying this program code to the computer, e.g., a memory medium for storing such a program code constitute the present invention. For example, the memory medium for storing such a program code can be constructed by using a floppy disk, a hard disk, an optical disk, a magnetooptic disk, a CD-ROM, a magnetic tape, a non-volatile memory card, a ROM, etc.

Such a program code is included in the embodiment of the invention of this application when the function in the above embodiment is realized by executing the supplied program code by the computer, and is also realized in cooperation with an OS (operating system) or another application software, etc. in which this program code is operated in the computer.

Further, the invention of this application includes a case in which the supplied program code is stored to a memory arranged in a functional extension board of the computer or a functional extension unit connected to the computer, and a CPU, etc. arranged in the functional extension board or the functional extension unit then perform one or all of the actual processing on the basis of commands of this program code, and the function in the above embodiment is realized by this processing.

As can be easily understood from the above explanation, in accordance with this embodiment, the image attribute in the tile unit in each resolution can be discriminated by applying the block selection technique to an image of the original resolution. An optimum compressing means can be designated in the individual tile on the basis of this discrimination. Accordingly, it is possible to realize high efficient image compression utilizing the original format of the flashpix.

What is claimed is:

1. An image processor comprising:
   an input device adapted to input an input image;
   a controller adapted to cause a memory to store the input image;
   a discriminator adapted to discriminate area information of the image stored in the memory by determining, for an area of the image, a type of image included within the area, and by determining a larger area including that area and having the same image type; and
   a converter adapted to convert the input image to a particular format on the basis of discriminating results obtained by said discriminator,
   wherein said discriminator determines a type for compression of the area by determining the larger area when a plurality of image types exist within the area, and to determine the larger area, without changing the image data, a size of the area is discriminated directly.

2. The image processor according to claim 1, wherein said discriminator outputs the area information of the image in a predetermined rectangular block unit.

3. The image processor according to claim 1, wherein said discriminator converts the image stored in the memory to a binary image, determines the type of the area by determining, based on the binary image, whether the area includes a color image, text, or a blank image, and determines the area information based on the determined type of that area.

4. The image processor according to claim 3, wherein said discriminator determines whether each of a plurality of areas of the image includes a color image, text, or a blank image.

5. The image processor according to claim 3, wherein said discriminator determines the larger area as the area information.

6. The image processor according to claim 3, wherein said discriminator determines the area information by performing a decision of majority based on the determined type of the area.

7. The image processor according to claim 1, wherein the converter includes:
- a selective compressor adapted selectively either to compress a color image in the area using a predetermined compressing technique, not to compress text in the area, or to compress a blank image in the area in a single color, on the basis of the discriminating results obtained by said discriminator; and
- an output converter adapted to convert an output of the selective compressor to a particular format.

8. An image processing method comprising the steps of:
- a control step, of causing a memory to store an input image;
- a discriminating step, of discriminating area information of the image stored in the memory, by determining, for an area of the image, a type of image included in the area, and by determining a larger area including that area and having the same image type; and
- a converting step, of converting the input image to a particular format on the basis of discriminating results obtained in the discriminating step,
- wherein the discriminating step includes determining a type for compression of the area by determining the larger area when a plurality of image types exist within the area, and to determine the larger area, without changing the image data, a size of the area is discriminated directly.

9. The image processing method according to claim 8, wherein the area information of the image is outputted for the area in the discriminating step.

10. The image processing method according to claim 8, further comprising a step of converting the image stored in the memory to a binary image, and wherein said image type determining step includes steps of determining, based on the binary image, whether the area includes a color image, text, or a blank image, and determining the area information based on the determined type of that area.

11. The image processing method according to claim 10, wherein said discriminating step is performed to determine whether each of a plurality of areas of the image includes a color image, text, or a blank image.

12. The image processing method according to claim 10, wherein said discriminating step includes determining the larger area as the area information.

13. The image processing method according to claim 10, wherein said discriminating step includes determining the area information by performing a decision of majority based on the determined type of the area.

14. The image processing method according to claim 8, wherein said converting step includes:
- a selective compressing step, of either compressing a color image in the area using a predetermined compressing technique, not compressing text in the area, or compressing a blank image in the area in a single color, based on the discriminating results obtained in the discriminating step; and
- a step of converting a result obtained in said selective compressing step to a particular format.

15. A computer-readable memory medium storing a program for executing the steps comprising:
- a control step, of causing a memory to store an input image;
- a discriminating step, of discriminating area information of the image stored in the memory; and
- a converting step, of converting the input image to a particular format on the basis of discriminating results obtained in the discriminating step,
- wherein the discriminating step includes determining a type for compression of the area by determining the larger area when a plurality of image types exist within the area, and to determine the larger area, without changing the image data, a size of the area is discriminated directly.

16. The memory medium according to claim 15, wherein the area information of the image is outputted for the area in said discriminating step.

17. The memory medium according to claim 15, further comprising a step of converting the image stored in the memory to a binary image, and wherein said image type determining step includes steps of determining, based on the binary image, whether the area includes a color image, text, or a blank image, and determining the area information based on the determined type of that area.

18. The memory medium according to claim 17, wherein said discriminating step is performed to determine whether each of a plurality of areas of the image includes a color image, text, or a blank image.

19. The memory medium according to claim 17, wherein said discriminating step includes determining the larger image area as the area information.

20. The memory medium according to claim 17, wherein said discriminating step includes determining the area information by performing a decision of majority based on the determined type of the area.

21. The memory medium according to claim 15, wherein said converting step includes:
- a selective compressing step, of either compressing a color image in the area using a predetermined compressing technique, not compressing text in the area, or compressing a blank image in the area in a single color, based on the discriminating results obtained in the discriminating step; and
- a step of converting a result obtained in said selective compressing step to a particular format.

22. The image processor according to claim 1, wherein the larger area is a largest image area having the same image type as the area.

23. The image processing method according to claim 8, wherein the larger area is a largest image area having the same image type as the area.

24. The memory medium according to claim 15, wherein the larger area is a largest image area having the same image type as the area.

* * * * *

UNITED STATES PATENT AND TRADEMARK OFFICE
CERTIFICATE OF CORRECTION

PATENT NO.        : 6,714,682 B2                                        Page 1 of 1
APPLICATION NO.   : 09/238550
DATED             : March 30, 2004
INVENTOR(S)       : Kitahiro Kaneda It is certified that error appears in the above-identified patent and that said Letters Patent is hereby corrected as shown below:

TITLE PAGE (*) NOTICE

Insert --This patent issued on a continued prosecution application filed under 37 CFR 1.53(d), and is subject to the twenty year patent term provisions of 35 U.S.C. 154(a)(2).--.

ON TITLE PAGE [63] RELATED U.S. APPLICATION DATA

"Continuation of application No. 08/657,566, filed on Jun. 5, 1996, now Pat. No. 5,900,905" should be deleted.

COLUMN 1

Lines 4-6 should be deleted.

Signed and Sealed this

Thirty-first Day of July, 2007

JON W. DUDAS
*Director of the United States Patent and Trademark Office*